(12) United States Patent
Liu et al.

(10) Patent No.: US 9,915,838 B2
(45) Date of Patent: Mar. 13, 2018

(54) DISPLAY PANEL AND METHOD FOR FABRICATING THE SAME

(71) Applicants: BOE TECHNOLOGY GROUP CO., LTD., Beijing (CN); BEIJING BOE DISPLAY TECHNOLOGY CO., LTD., Beijing (CN)

(72) Inventors: Sha Liu, Beijing (CN); Feng Zhao, Beijing (CN)

(73) Assignees: BOE Technology Group Co., Ltd., Beijing (CN); Beijing BOE Display Technology Co., Ltd., Beijing (CN)

(*) Notice: Subject to any disclaimer, the term of this patent is extended or adjusted under 35 U.S.C. 154(b) by 133 days.

(21) Appl. No.: 14/913,052

(22) PCT Filed: Oct. 20, 2015

(86) PCT No.: PCT/CN2015/092257
§ 371 (c)(1),
(2) Date: Feb. 19, 2016

(87) PCT Pub. No.: WO2016/062235
PCT Pub. Date: Apr. 28, 2016

(65) Prior Publication Data
US 2016/0282646 A1 Sep. 29, 2016

(30) Foreign Application Priority Data
Oct. 24, 2014 (CN) .......................... 2014 1 0575707

(51) Int. Cl.
*G02F 1/1337* (2006.01)
*G02F 1/1335* (2006.01)
(Continued)

(52) U.S. Cl.
CPC .......... *G02F 1/1337* (2013.01); *G02F 1/1341* (2013.01); *G02F 1/13439* (2013.01);
(Continued)

(58) Field of Classification Search
None
See application file for complete search history.

(56) References Cited

U.S. PATENT DOCUMENTS

| | | | | |
|---|---|---|---|---|
| 2003/0090212 A1* | 5/2003 | Park | ......................... | H01J 11/12 315/169.1 |
| 2005/0219446 A1* | 10/2005 | Hisatake | ........... | G02F 1/133555 349/114 |

(Continued)

FOREIGN PATENT DOCUMENTS

| | | |
|---|---|---|
| CN | 101211047 A | 7/2008 |
| CN | 102736332 A | 10/2012 |

(Continued)

OTHER PUBLICATIONS

Written Opinion of the International Searching Authority dated Jan. 7, 2016 corresponding to International application No. PCT/CN2015/092257.

(Continued)

*Primary Examiner* — Ryan Crockett
(74) *Attorney, Agent, or Firm* — Nath, Goldberg & Meyer; Joshua B. Goldberg; Annie Kock (57) ABSTRACT

The present invention is related to display technology. Embodiments of the present invention provide a display panel and a method for fabricating the same which can prevent light leakage of the display panel. The display panel comprises a central area and a peripheral area surrounding the central area, wherein the central area is applied with horizontal electric field or multi-dimensional electric field, the peripheral area is applied with vertical electric field.

10 Claims, 3 Drawing Sheets

(51) Int. Cl.
*G02F 1/1341* (2006.01)
*G02F 1/1343* (2006.01)
*G02F 1/1333* (2006.01)

(52) U.S. Cl.
CPC .. *G02F 1/133514* (2013.01); *G02F 1/133753* (2013.01); *G02F 1/133784* (2013.01); *G02F 1/133788* (2013.01); *G02F 1/134309* (2013.01); *G02F 1/134363* (2013.01); *G02F 2001/13415* (2013.01); *G02F 2001/133388* (2013.01); *G02F 2001/133746* (2013.01); *G02F 2001/133749* (2013.01); *G02F 2001/134381* (2013.01)

(56) References Cited

U.S. PATENT DOCUMENTS

| 2009/0075044 | A1* | 3/2009 | Tsubata | G02F 1/13439 428/213 |
| 2012/0026440 | A1* | 2/2012 | Suwa | G02F 1/133711 349/123 |
| 2012/0188476 | A1* | 7/2012 | Hirakata | G02F 1/1333 349/38 |
| 2013/0050625 | A1* | 2/2013 | Jung | B32B 3/02 349/128 |
| 2016/0291426 | A1* | 10/2016 | Wang | G02F 1/134309 |

FOREIGN PATENT DOCUMENTS

| CN | 103197478 A | 7/2013 |
| CN | 103293789 A | 9/2013 |
| CN | 103487986 A | 1/2014 |
| CN | 103926742 A | 7/2014 |
| CN | 104280953 A | 1/2015 |
| CN | 104808844 A | 7/2015 |
| EP | 1584972 A1 | 10/2005 |

OTHER PUBLICATIONS

International Search Report dated Jan. 7, 2016 corresponding to International application No. PCT/CN2015/092257.
First Office Action dated Sep. 30, 2016 corresponding to Chinese application No. 201410575707.5.

* cited by examiner

| forming an array substrate, wherein the central area of the array substrate is provided with the first pixel electrodes and the first common electrode, the first pixel electrodes and/or the first common electrode are slit electrodes, the peripheral area of the array substrate is provided with the second pixel electrodes | S401 |
|---|---|
| forming a color filter substrate, wherein the peripheral area of the color filter substrate is provided with a second common electrode, the second pixel electrodes and the second common electrode are plate-shaped electrodes | S402 |

Fig.4

DISPLAY PANEL AND METHOD FOR FABRICATING THE SAME

FIELD OF THE INVENTION

The present invention relates to the field of display technology, in particular to a display panel and a method for fabricating the same.

BACKGROUND OF THE INVENTION

ADS (Advanced Super Dimension Switch) display panel is a display panel having an ADS display mode, which has advantages such as wide viewing angle, small color bias and high transmittance.

Specifically, ADS display panel causes the liquid crystal molecules within the ADS display panel to deflect by the electric field produced by edges of the pixel electrodes in a same plane and the multidimensional field formed by the electric field produced between the pixel electrodes and the common electrode. The ADS display panel comprises a display area and a non-display area surrounding the display area. The ADS display mode is a kind of normally black mode, wherein the liquid crystal molecules in the non-display area do not rotate when the ADS display panel is in a non-closed state (including a dark state and a display state), thereby no light can transmit through the non-display area and the non-display area renders a dark state.

The inventors found that, when the ADS display panel in a non-closed state is compressed by external forces, the liquid crystal molecules in the non-display area of the ADS display panel will be deflected to some extent, resulting in light leakage of the ADS display panel.

SUMMARY OF THE INVENTION

An object of the present invention is to provide a display panel and a method for fabricating the same which can prevent light leakage of the display panel.

To solve the above technical problems, according to the embodiments of the present invention, there is provided a display panel adopting the following technical solution.

A display panel comprises a central area and a peripheral area surrounding the central area, wherein the central area is applied with horizontal electric field or multi-dimensional electric field, the peripheral area is applied with vertical electric field.

The display panel includes an array substrate and a color filter substrate disposed opposite to each other, the central area of the array substrate is provided with first pixel electrodes and a first common electrode, the first pixel electrodes and/or the first common electrode are slit electrodes; the peripheral area of the array substrate is provided with second pixel electrodes, the peripheral area of the color filter substrate is provided with a second common electrode, the second pixel electrodes and/or the second common electrode are plate-shaped electrodes.

The display panel further includes a liquid crystal molecule layer located between the array substrate and the color filter substrate, wherein the liquid crystal molecules at the central area have a horizontal initial alignment direction, and the liquid crystal molecules at the peripheral area have an initial alignment direction which is progressively twisted and has an angle difference less than 90°.

A first alignment film and a third alignment film provide the horizontal initial alignment direction for the liquid crystal molecules at the central area; a second alignment film and a fourth alignment film provide the initial alignment direction which is progressively twisted and has an angle difference less than 90° for the liquid crystal molecules at the peripheral area.

The first alignment film is located at the central area of the array substrate, the third alignment film is located at the central area of the color filter substrate, the first alignment film and the third alignment film provide horizontal initial alignment direction for the liquid crystal molecules, the second alignment film is located at the peripheral area of the array substrate, the fourth alignment film is located at the peripheral area of the color filter substrate, the alignment angle difference between the second and the fourth alignment films is 90°.

The first alignment film, the second alignment film, the third alignment film and the fourth alignment film are formed by rubbing alignment process to achieve predetermined initial alignment direction.

The first alignment film, the second alignment film, the third alignment film and the fourth alignment film are formed by photo-alignment process to achieve predetermined initial alignment direction.

The central area is located within or corresponds to the display area of the display panel.

An embodiment of the present invention provides a display panel including the central area and the peripheral area, the display mode of the central area is a display mode controlled by a horizontal electric field or multi-dimensional electric field, the display mode of the peripheral area is a display mode controlled by a vertical electric field, thus the dark state of the peripheral area is controlled by electric field and will not be influenced by external forces, thereby the display panel can be prevented from light leakage.

In order to solve above technical problems, an embodiment of the present invention provides a method for fabricating a display panel using the following technical solution.

A method for fabricating a display panel comprises:

forming an array substrate, wherein the central area of the array substrate is provided with the first pixel electrodes and the first common electrode, the first pixel electrodes and/or the first common electrode are slit electrodes, the peripheral area of the array substrate is provided with the second pixel electrodes;

forming a color filter substrate, wherein the peripheral area of the color filter substrate is provided with a second common electrode, the second pixel electrodes and/or the first common electrode are plate-shaped electrodes;

wherein the central area is applied with horizontal electric field or multi-dimensional electric field by the first pixel electrodes and the first common electrode, the peripheral area is applied with vertical electric field by the second pixel electrodes and the first common electrode.

Forming a first alignment film on the central area of the array substrate;

forming a second alignment film on the peripheral area of the array substrate;

forming a third alignment film on the central area of the color film substrate;

forming a fourth alignment film on the peripheral area of the color film substrate;

wherein the first alignment film and the third alignment film provide the horizontal initial alignment direction for the liquid crystal molecules at the central area; the alignment angle difference between the second and the fourth alignment films is 90°.

The steps of forming the first alignment film, the second alignment film, the third alignment film and the fourth alignment film comprise rubbing alignment process.

The method for fabricating a display panel further comprises:

dripping photosensitive groups and the liquid crystal molecules onto the central area of the array substrate or the central area of the color film substrate, exposing to ultraviolet ray, so as to provide horizontal initial alignment direction for the liquid crystal molecules at the central area;

dripping photosensitive groups and the liquid crystal molecules onto the peripheral area of the array substrate or the peripheral area of the color film substrate, exposing to ultraviolet ray, so as to provide an initial alignment direction which is progressively twisted and has an angle difference less than 90° for the liquid crystal molecules at the peripheral area.

Embodiments of the present invention provide a method for fabricating a display panel, comprising:

forming an array substrate, wherein the central area of the array substrate is provided with the first pixel electrodes and the first common electrode, the first pixel electrodes and/or the first common electrode are slit electrodes, the peripheral area of the array substrate is provided with the second pixel electrodes; and forming a color filter substrate, wherein the peripheral area of the color filter substrate is provided with a second common electrode, the second pixel electrodes and/or the first common electrode are plate-shaped electrodes, so that the formed display panel has a dark state of the peripheral area which is controlled by electric field and will not be influenced by external forces, thereby the display panel can be prevented from light leakage.

BRIEF DESCRIPTION OF THE DRAWINGS

In order to more clearly illustrate the embodiments of the present invention or the technical solutions of prior art, the accompanying drawings to which description of the embodiments refers will be briefly described. Apparently, the accompanying drawings to be described below is only a part of the embodiments of the present invention, those skilled in the art can obtain other drawings based on these accompanying drawings without creative efforts.

REFERENCE NUMERALS a—central area; b—peripheral area; 1—array substrate; 11—first pixel electrode; 12—first common electrode; 13—second pixel electrode; 14—thin film transistor; 2—color filter substrate; 21—second common electrode; 22—black matrix; 23—color filter layer; 3—liquid crystal molecules layer; 4—first alignment film; 5—third alignment film; 6—second alignment film; 7—fourth alignment film; 8—lower polarizer; 9—upper polarizer.

DETAILED DESCRIPTION OF THE EMBODIMENTS

A clear and complete description of the embodiments of the present invention will now be made in conjunction with the accompanying drawings. Apparently, the described embodiments are part of rather than all of the embodiments of the present invention. In view of the embodiments of the present invention, other embodiments can be obtained by those skilled in the art without creative efforts, and these embodiments also fall within the protective scope of present invention.

First Embodiment

An embodiment of the invention provides a display panel, the display panel can be prevented from light leakage.

Figure 1:
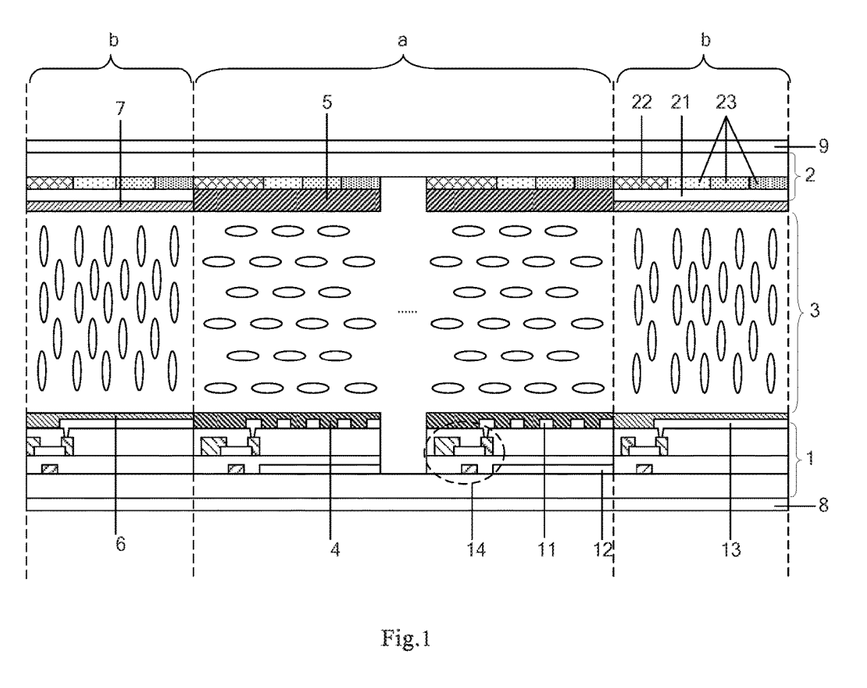
FIG. 1 is a schematic view showing the display panel in a display state according to the first embodiment of the present invention.
Figure 2:
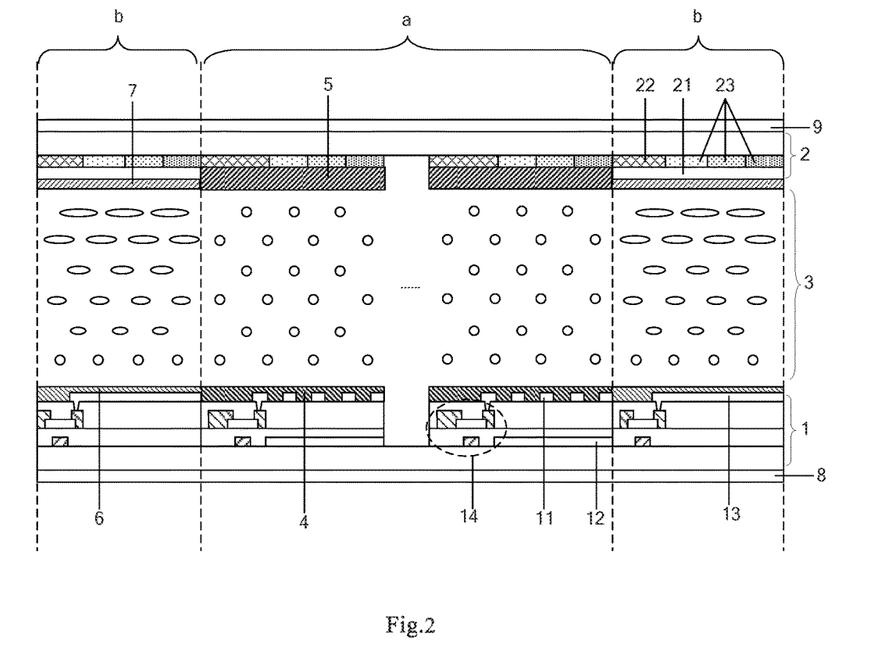
FIG. 2 is a schematic view showing the display panel in a closed state according to the first embodiment of the present invention.
Figure 3:
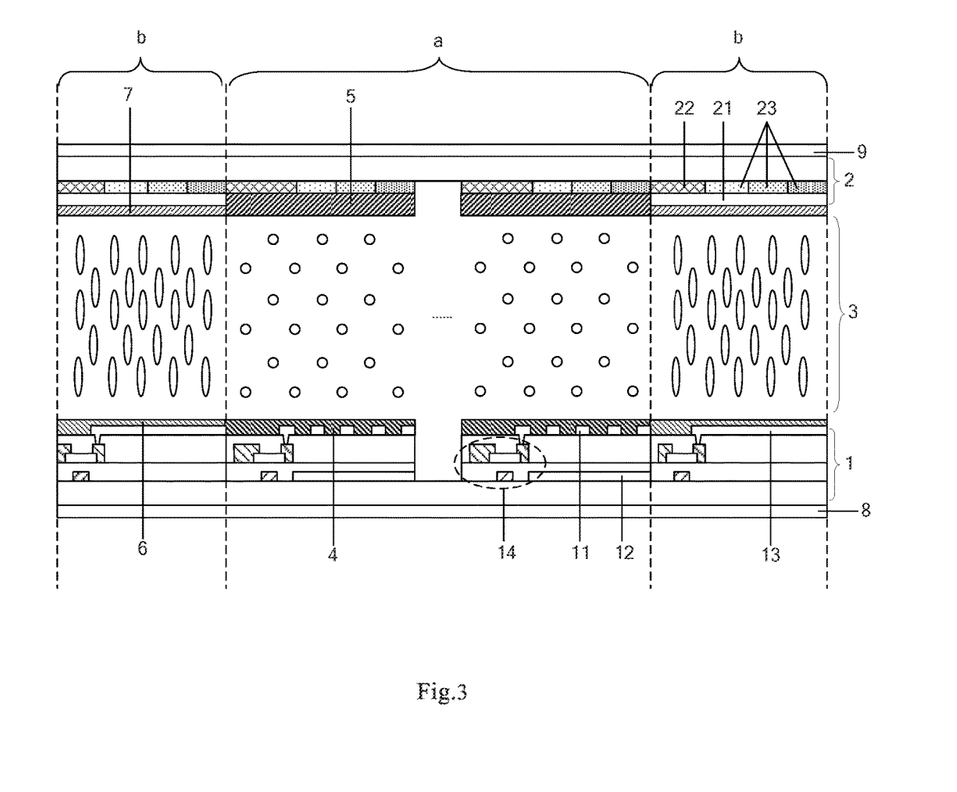
FIG. 3 is a schematic view showing the display panel in a dark state according to the first embodiment of the present invention.

Specifically, as shown in FIG. 1, FIG. 2 and FIG. 3, the display panel is divided into a central area a and a peripheral area b, wherein the display mode of the central area a is a display mode controlled by a horizontal electric field or multi-dimensional electric field, the display mode of the peripheral area b is a display mode controlled by a vertical electric field. In an example, the display mode of the central area a is ADS mode, the display mode of the peripheral area b is a TN mode. The central area a is located within or corresponds to the display area of the display panel. Specifically, the specific size relationship between the display area and the central area a can be designed based on the specific position of the frame and common light leakage ranges in the prior art solutions.

An embodiment of the present invention provides a display panel including the central area and the peripheral area, the display mode of the central area is a display mode controlled by a horizontal electric field or multi-dimensional electric field, the display mode of the peripheral area is a display mode controlled by a vertical electric field, thus the dark state of the peripheral area is controlled by electric field and will not be influenced by external forces, thereby the display panel can be prevented from light leakage.

Specifically, as shown in FIG. 1, FIG. 2 and FIG. 3, the display panel includes an array substrate 1 and a color filter substrate 2 disposed opposite to each other, the central area of the array substrate 1 is provided with first pixel electrodes 11 and a first common electrode 12, the first pixel electrodes 11 and/or the first common electrode 12 are slit electrodes; the peripheral area of the array substrate 1 is provided with second pixel electrodes 13, the peripheral area of the color filter substrate 2 is provided with a second common electrode 21, the second pixel electrodes 13 and the second common electrode 21 are plate-shaped electrodes, thereby the display mode of the central area a is a display mode controlled by a horizontal electric field or multi-dimensional electric field, the display mode of the peripheral area b is a display mode controlled by a vertical electric field.

The display panel further includes a liquid crystal molecule layer 3 located between the array substrate 1 and the color filter substrate 2, the liquid crystal molecules in the liquid crystal molecule layer 3 have certain initial alignment direction, wherein as shown in FIG. 2, the liquid crystal molecules at the central area of the liquid crystal molecule layer 3 have a horizontal initial alignment direction, and the liquid crystal molecules at the peripheral area of the liquid crystal molecule layer 3 have an initial alignment direction which is progressively twisted and has an angle difference less than 90°.

According to an embodiment of the present invention, as shown in FIG. 2, the first alignment film 4 and the third alignment film 5 provide the horizontal initial alignment direction for the liquid crystal molecules at the central area of the liquid crystal molecule layer 3; the second alignment film 6 and the fourth alignment film 7 provide the initial alignment direction which is progressively twisted and has an angle difference less than 90° for the liquid crystal molecules at the peripheral area of the liquid crystal molecule layer 3. As an example, the first alignment film 4 is located at the central area of the array substrate 1, the third alignment film 5 is located at the central area of the color filter substrate 2, the first alignment film 4 and the third alignment film 5 provide horizontal initial alignment direction for the liquid crystal molecules, the second alignment film 6 is located at the peripheral area of the array substrate 1, the fourth alignment film 7 is located at the peripheral area of the color filter substrate 2, the alignment angle difference between the second alignment film 6 and the fourth alignment film 7 is 90°.

According to the embodiment of the present invention, the alignment films are provided in two ways to be described below, so that the liquid crystal molecules at the central area of the liquid crystal molecule layer 3 have a horizontal initial alignment direction, and the liquid crystal molecules at the peripheral area of the liquid crystal molecule layer 3 have an initial alignment direction which is progressively twisted and has an angle difference less than 90°.

In the first way, the first alignment film 4, the second alignment film 6, the third alignment film 5 and the fourth alignment film 7 are subjected to a rubbing alignment process to provide predetermined initial alignment direction for the liquid crystal molecules of the liquid crystal molecule layer 3. The rubbing directions of the first alignment film 4, the second alignment film 6, the third alignment film 5 and the fourth alignment film 7 may be the same or form certain angle therebetween, as long as the liquid crystal molecules at the central area of the liquid crystal molecule layer 3 have a horizontal initial alignment direction, and the liquid crystal molecules at the peripheral area of the liquid crystal molecule layer 3 have an initial alignment direction which is progressively twisted and has an angle difference less than 90°. The rubbing direction is not limited in the embodiment of the present invention.

In the second way, the first alignment film 4, the second alignment film 6, the third alignment film 5 and the fourth alignment film 7 are subjected to a photo-alignment process to provide predetermined initial alignment direction for the liquid crystal molecules of the liquid crystal molecule layer 3. Specifically, the liquid crystal molecule layer 3 comprises liquid crystal molecules and photosensitive groups. When forming the liquid crystal molecule layer 3, the liquid crystal molecules and photosensitive groups are dripped onto the array substrate 1 or the color film substrate 2 and exposed to ultraviolet ray, the acting force between the alignment film and photosensitive groups causes the photosensitive groups to be aligned along certain direction, thereby the liquid crystal molecules are also aligned along the same direction by the acting force between the liquid crystal molecules and the photosensitive groups.

The expression of "an initial alignment direction which is progressively twisted and has an angle difference less than 90° for the liquid crystal molecules at the peripheral area" refers to that, the liquid crystal molecules at the peripheral area have an initial alignment direction on the side of the array substrate and another initial alignment direction differed by 90° on the side of the color film substrate, the liquid crystal molecules between the two sides are progressively twisted, in other words, the initial alignment direction of the liquid crystal molecules is changed progressively/gradually from one side to the other side, with an angle difference less than 90°.

In order to facilitate understanding of the skilled person, a specific display panel as shown in FIGS. 1-3 is provided in an embodiment of the present invention. The display panel comprises in turn a lower polarizer 8, the array substrate 1, the first alignment film 4, the second alignment film 6, the liquid crystal molecule layer 3, the third alignment film 5, the fourth alignment film 7, the color filter substrate 2 and the upper polarizer 9.

The direction of the transmission axis of the lower polarizer 8 is perpendicular to that of the upper polarizer 9.

The central area a of the array substrate 1 is provided with thin film transistors 14, the first pixel electrodes 11 and the first common electrode 12, the first pixel electrodes 11 and/or the first common electrode 12 are slit electrodes. The peripheral area of the array substrate 1 is provided with thin film transistors 14 and the plate-shaped second pixel electrodes 13. The thin film transistors 14 on the array substrate 1 may be of bottom gate type or top gate type, which is not limited in the present invention. The array substrate 1 further comprises gate lines and data lines intersected with each other.

The central area of the color film substrate 2 is provided with a black matrix 22 and a color filter layer 23, the peripheral area of the color film substrate 2 is provided with the black matrix 22, the color filter layer 23 and a plate-shaped second common electrode 21.

The first alignment film 4 and the third alignment film 5 are respectively located at the central area of the array substrate 1 and the central area of the color film substrate 2. The first alignment film 4 and the third alignment film 5 have recesses formed by rubbing alignment, the extending direction (i.e. the direction of rubbing alignment) of the recesses on the first alignment film 4 and the third alignment film 5 is parallel to the transmission axis direction of the lower polarizer 8, so that the liquid crystal molecules at the central area of the liquid crystal molecule layer 3 are arranged with their long axis parallel to the transmission axis direction of the lower polarizer 8, thereby a horizontal initial alignment direction is achieved. The second alignment film 6 and the fourth alignment film 7 are respectively located at the peripheral area of the array substrate 1 and the peripheral area of the color film substrate 2. The second alignment film 6 and the fourth alignment film 7 also have recesses formed by rubbing alignment, the extending direction of the recess on the second alignment film 6 is parallel to the transmission axis direction of the lower polarizer 8, the extending direction of the recess on the fourth alignment film 7 is parallel to the transmission axis direction of the upper polarizer 9. The second alignment film 6 causes the liquid crystal molecules close to the second alignment film 6 to be arranged with their long axis parallel to the transmission axis direction of the lower polarizer 8, the fourth alignment film 7 causes the liquid crystal molecules close to the fourth alignment film 7 to be arranged with their long axis parallel to the transmission axis direction of the upper polarizer 9, so that the liquid crystal molecules at the peripheral area of the liquid crystal molecule layer 3 have an initial alignment direction which is progressively twisted and has an angle difference less than 90°.

For the central area a of the display panel having the above structure, after the light passes through the lower polarizer 8, since the first alignment film 4 and the third alignment film 5 cause the liquid crystal molecules at the central area of the liquid crystal molecule layer 3 to be arranged with their long axis parallel to the transmission axis direction of the lower polarizer 8, while the transmission axis direction of the lower polarizer 8 is perpendicular to that of the upper polarizer 9. Therefore, as shown in FIGS. 2-3, when no electric field is applied between the first pixel electrodes 11 and the first common electrode 12, light cannot pass through the upper polarizer 9, so that the central area a of the display panel is normally black. Also, as shown in FIG. 1, when an electric field is applied between the first pixel electrodes 11 and the first common electrode 12, the liquid crystal molecules are deflected to have their long axis parallel to the transmission axis direction of the upper polarizer 9, therefore light can pass through the upper polarizer 9.

For the peripheral area b of the display panel having the above structure, after the light passes through the lower polarizer 8, since the second alignment film 6 causes the liquid crystal molecules close to the second alignment film 6 to be arranged with their long axis parallel to the transmission axis direction of the lower polarizer 8, the fourth alignment film 7 causes the liquid crystal molecules close to the fourth alignment film 7 to be arranged with their long axis parallel to the transmission axis direction of the upper polarizer 9, and the transmission axis direction of the lower polarizer 8 is perpendicular to that of the upper polarizer 9. Therefore, as shown in FIG. 2, when no electric field is applied between the second pixel electrodes 13 and the second common electrode 21, light can pass through the upper polarizer 9, and the peripheral area b of the display panel is normally white.

As shown in FIGS. 1 and 3, when an electric field is applied between the second pixel electrodes 13 and the second common electrode 21, the liquid crystal molecules at the peripheral area of the liquid crystal molecule layer 3 will be arranged with their long axis parallel to the direction of the electric field, that is, arranged along a direction perpendicular to the array substrate 1 and the color filter substrate 2, therefore light cannot pass through the upper polarizer 9, and the peripheral area b of the display panel is in a dark state.

From above, the dark state of the peripheral area b of the display panel having above structure is controlled by electric field and will not be influenced by external forces, thereby the display panel can be prevented from light leakage.

Note that the central area a and the peripheral area b of the display panel may be controlled by a single drive circuit, or by two drive circuits respectively. As an example, when the central area a and the peripheral area b of the display panel are controlled by a single drive circuit, a connection point may be provided in the display panel for connecting the first common electrode 12 on the array substrate 1 and the second common electrode 21 on the color film substrate 2, thereby a same voltage is applied to both the first common electrode 12 and the second common electrode 21.

Second Embodiment

Figure 4:
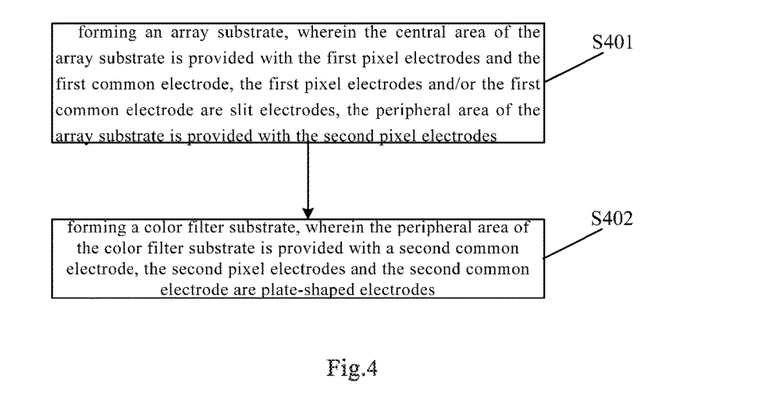
FIG. 4 is a flowchart illustrating the fabricating method of the display panel according to an embodiment of the present invention.

An embodiment of the present invention provides a method for fabricating a display panel comprising the steps shown in FIG. 4:

step S401, forming an array substrate, wherein the central area of the array substrate is provided with the first pixel electrodes and the first common electrode, the first pixel electrodes and/or the first common electrode are slit electrodes, the peripheral area of the array substrate is provided with the second pixel electrodes;

step S402, forming a color filter substrate, wherein the peripheral area of the color filter substrate is provided with a second common electrode, the second pixel electrodes and the second common electrode are plate-shaped electrodes.

Note that the sequence of forming the structures at the central area of the array substrate and the structures at the peripheral area of the array substrate is not limited in the fabricating method. Persons skilled in the art may make their choice depending on practical requirement.

Embodiments of the present invention provides a method for fabricating a display panel, the method comprises forming an array substrate, wherein the central area of the array substrate is provided with the first pixel electrodes and the first common electrode, the first pixel electrodes and/or the first common electrode are slit electrodes, the peripheral area of the array substrate is provided with the second pixel electrodes; and forming a color filter substrate, wherein the peripheral area of the color filter substrate is provided with a second common electrode, the second pixel electrodes and/or the second common electrode are plate-shaped electrodes, so that the formed display panel has a dark state of the peripheral area which is controlled by electric field and will not be influenced by external forces, thereby the display panel can be prevented from light leakage.

In order to provide certain initial alignment direction for the liquid crystal molecules in the liquid crystal molecule layer 3, the fabricating method of the display panel also comprises: forming a first alignment film 4 on the central area of the array substrate 1; forming a second alignment film 6 on the peripheral area of the array substrate 1; forming a third alignment film 5 on the central area of the color film substrate 2; forming a fourth alignment film 7 on the peripheral area of the color film substrate 2; wherein the first alignment film 4 and the third alignment film 5 provide the horizontal initial alignment direction for the liquid crystal molecules at the central area of the liquid crystal molecule layer 3; the alignment angle difference between the second alignment film 6 and the fourth alignment film 7 is 90°.

Also note that, the sequence for forming the respective alignment films is not limited in the fabricating method. Persons skilled in the art may make their choice depending on practical requirement.

Further, according to an embodiment of the present invention, the alignment films are fabricated in two ways to be described below, so that the liquid crystal molecules at the central area of the liquid crystal molecule layer 3 are caused to have a horizontal initial alignment direction by the first alignment film 4 and the third alignment film 5, and the liquid crystal molecules at the peripheral area of the liquid crystal molecule layer 3 are caused to have an initial alignment direction which is progressively twisted and has an angle difference less than 90° by the second alignment film 6 and the fourth alignment film 7.

In the first way, the first alignment film 4 and the third alignment film 5 are formed on the central area of the array substrate 1, the second alignment film 6 and the fourth alignment film 7 are formed on the peripheral area of the array substrate 1, then the alignment films are subjected to a rubbing alignment process. The rubbing directions of the first alignment film 4, the second alignment film 6, the third alignment film 5 and the fourth alignment film 7 may be the same or form certain angle therebetween, as long as the liquid crystal molecules at the central area of the liquid crystal molecule layer 3 have a horizontal initial alignment direction, and the liquid crystal molecules at the peripheral area of the liquid crystal molecule layer 3 have an initial alignment direction which is progressively twisted and has an angle difference less than 90°. The rubbing direction is not specific limited in the embodiment of the present invention.

In the second way, photosensitive groups and the liquid crystal molecules are dripped onto the central area of the array substrate 1 or the central area of the color film substrate 2 and exposed to ultraviolet ray, so as to provide horizontal initial alignment direction for the liquid crystal molecules at the central area of the liquid crystal molecule layer 3;

photosensitive groups and the liquid crystal molecules are dripped onto the peripheral area of the array substrate 1 or the peripheral area of the color film substrate 2 and exposed to ultraviolet ray, so as to provide an initial alignment direction which is progressively twisted and has an angle difference less than 90° for the liquid crystal molecules at the peripheral area.

The foregoing embodiments are only specific embodiments of the present invention, the protective scope of the present invention is not limited thereto. Various variations or replacements that are apparent to those skilled in the art should fall within the scope of the present invention. Accordingly, the scope of the present invention should be defined by the claims.

The invention claimed is:

1. A display panel, comprising:
a central area and a peripheral area surrounding the central area;
an array substrate and a color filter substrate disposed opposite to each other; and
a liquid crystal molecule layer located between the array substrate and the color filter substrate,
wherein the central area is applied with horizontal electric field or multi-dimensional electric field, the peripheral area is applied with vertical electric field, the liquid crystal molecules at the central area have a horizontal initial alignment direction, and the liquid crystal molecules at the peripheral area have an initial alignment direction which is progressively twisted and has an angle difference less than 90°.

2. The display panel according to claim 1, wherein the central area of the array substrate is provided with first pixel electrodes and a first common electrode, the first pixel electrodes and/or the first common electrode are slit electrodes; the peripheral area of the array substrate is provided with second pixel electrodes, the peripheral area of the color filter substrate is provided with a second common electrode, the second pixel electrodes and the second common electrode are plate-shaped electrodes.

3. The display panel according to claim 1, wherein a first alignment film and a third alignment film provide the horizontal initial alignment direction for the liquid crystal molecules at the central area; the alignment angle difference between a second and a fourth alignment films is 90°.

4. The display panel according to claim 3, wherein the first alignment film is located at the central area of the array substrate, the third alignment film is located at the central area of the color filter substrate, the first alignment film and the third alignment film provide horizontal initial alignment direction for the liquid crystal molecules, the second alignment film is located at the peripheral area of the array substrate, the fourth alignment film is located at the peripheral area of the color filter substrate, the second alignment film and the fourth alignment film provide the initial alignment direction which is progressively twisted and has an angle difference less than 90° for the liquid crystal molecules.

5. The display panel according to claim 4, wherein the first alignment film, the second alignment film, the third alignment film and the fourth alignment film are formed by rubbing alignment process to achieve predetermined initial alignment direction.

6. The display panel according to claim 4, wherein the first alignment film, the second alignment film, the third alignment film and the fourth alignment film are formed by photo-alignment process to achieve predetermined initial orientation.

7. The display panel according to claim 1, wherein the central area is located within or corresponds to the display area of the display panel.

8. A method for fabricating a display panel, comprising:
forming an array substrate, wherein the central area of the array substrate is provided with first pixel electrodes and a first common electrode, the first pixel electrodes and/or the first common electrode are slit electrodes, the peripheral area of the array substrate is provided with the second pixel electrodes;
forming a color filter substrate, wherein the peripheral area of the color filter substrate is provided with a second common electrode, the second pixel electrodes and the second common electrode are plate-shaped electrodes;
wherein the central area is applied with horizontal electric field or multi-dimensional electric field by the first pixel electrodes and the first common electrode, the peripheral area is applied with vertical electric field by the second pixel electrodes and the second common electrode,
the method further comprises:
forming a first alignment film on the central area of the array substrate;
forming a second alignment film on the peripheral area of the array substrate;
forming a third alignment film on the central area of the color film substrate;
forming a fourth alignment film on the peripheral area of the color film substrate;
wherein the first alignment film and the third alignment film provide the horizontal initial alignment direction for the liquid crystal molecules at the central area; the alignment angle difference between the second and the fourth alignment films is 90°.

9. The method according to claim 8, wherein the steps of forming the first alignment film, the second alignment film, the third alignment film and the fourth alignment film comprise rubbing alignment process for alignment.

10. The method according to claim 8, further comprises:
dripping photosensitive groups and the liquid crystal molecules onto the central area of the array substrate or the central area of the color film substrate, exposing to ultraviolet ray, so as to provide horizontal initial alignment direction for the liquid crystal molecules at the central area;
dripping photosensitive groups and the liquid crystal molecules onto the peripheral area of the array substrate or the peripheral area of the color film substrate, exposing to ultraviolet ray, so as to provide an initial alignment direction which is progressively twisted and has an angle difference less than 90° for the liquid crystal molecules at the peripheral area.

* * * * *